US009651750B2

(12) United States Patent
Moriyama et al.

(10) Patent No.: US 9,651,750 B2
(45) Date of Patent: May 16, 2017

(54) OPTICAL CONNECTOR

(71) Applicant: FUJITSU COMPONENT LIMITED, Tokyo (JP)

(72) Inventors: Satoshi Moriyama, Tokyo (JP); Ayumu Akabane, Tokyo (JP); Osamu Daikuhara, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 66 days.

(21) Appl. No.: 14/331,919

(22) Filed: Jul. 15, 2014

(65) Prior Publication Data
US 2015/0023636 A1    Jan. 22, 2015

(30) Foreign Application Priority Data

Jul. 18, 2013    (JP) ................................. 2013-149823

(51) Int. Cl.
*G02B 6/42* (2006.01)
*G02B 6/32* (2006.01)
*G02B 6/38* (2006.01)
*G02B 6/10* (2006.01)

(52) U.S. Cl.
CPC ............ *G02B 6/428* (2013.01); *G02B 6/10* (2013.01); *G02B 6/325* (2013.01); *G02B 6/3846* (2013.01); *G02B 6/3853* (2013.01); *G02B 6/3861* (2013.01); *G02B 6/3885* (2013.01); *G02B 6/4284* (2013.01)

(58) Field of Classification Search
CPC .. G02B 6/3887; G02B 6/3893; G02B 6/3869; G02B 6/3885

USPC ...................................................... 385/53, 84
See application file for complete search history.

(56) References Cited

U.S. PATENT DOCUMENTS

| 7,556,441 | B2* | 7/2009 | Furuyama | G02B 6/255 |
| | | | | 385/137 |
| 7,802,924 | B2* | 9/2010 | Riska et al. | 385/59 |
| 2001/0053266 | A1* | 12/2001 | Suematsu | G02B 6/3839 |
| | | | | 385/80 |
| 2004/0208456 | A1* | 10/2004 | Yang et al. | 385/78 |
| 2006/0093279 | A1* | 5/2006 | Plotts | G02B 6/3885 |
| | | | | 385/80 |
| 2008/0118205 | A1* | 5/2008 | Furuyama | G02B 6/255 |
| | | | | 385/70 |

(Continued)

FOREIGN PATENT DOCUMENTS

| JP | 2002-23018 | 1/2002 |
| JP | 2003-50339 | 2/2003 |

(Continued)

OTHER PUBLICATIONS

Japanese Office Action mailed Jan. 31, 2017 in related Japanese application No. 2013-149823.

*Primary Examiner* — Thomas A Hollweg
*Assistant Examiner* — Mary A El Shammaa
(74) *Attorney, Agent, or Firm* — Staas & Halsey LLP

(57) ABSTRACT

An optical connector has an optical waveguide slit and a pass-through hole. The optical waveguide slit is a hole that extends from an insertion surface of a connector body into the connector body. The optical waveguide slit accommodates a sheet-like optical waveguide whose tip abuts against a slit bottom. The pass-through hole is provided near the slit bottom, and passes through the top surface of the connector body and the top surface of the optical waveguide slit.

5 Claims, 5 Drawing Sheets

(56) References Cited

U.S. PATENT DOCUMENTS

| | | | |
|---|---|---|---|
| 2011/0091167 A1* | 4/2011 | Nishimura | G02B 6/4214 385/88 |
| 2011/0262083 A1* | 10/2011 | Tamura | G02B 6/4204 385/93 |
| 2013/0011100 A1* | 1/2013 | Shiraishi | 385/77 |

FOREIGN PATENT DOCUMENTS

| | | |
|---|---|---|
| JP | 2007226081 A * | 9/2007 |
| JP | 2013-20027 | 1/2013 |
| JP | 2013-29782 | 2/2013 |
| JP | 2014-85417 | 5/2014 |

* cited by examiner

OPTICAL CONNECTOR

CROSS-REFERENCE TO RELATED APPLICATION(S)

This application is based upon and claims the benefit of priority of the prior Japanese Patent Application No. 2013-149823, filed on Jul. 18, 2013, the entire contents of which are incorporated herein by reference.

FIELD

The embodiment discussed herein is directed to an optical connector.

BACKGROUND

Conventionally, optical connectors for connecting an optical fiber having a circular cross section to a sheet-like optical waveguide have been disclosed. Such optical connectors have a first ferrule and a second ferrule that can be connected to each other with their connecting surfaces abutting against each other. Provided on the insertion surface that is on the side opposite to the connecting surface of the first ferrule is a first receptacle into which an optical fiber is inserted. An optical fiber is inserted into the first receptacle, and the optical fiber whose tip is brought into contact with the bottom of the first receptacle is held by the first receptacle. The second ferrule has a slit-shaped second receptacle that is a hollow extending from the insertion surface on the side opposite to the connecting surface into the body of the second ferrule. A sheet-like optical waveguide is inserted into the second receptacle, and the sheet-like optical waveguide whose tip is brought into contact with the bottom of the second receptacle is held by the second receptacle. The width and the height of the second receptacle are approximately the same as the width and the thickness of the optical waveguide, respectively.

The second ferrule may also have a third receptacle on the connecting surface, and a lens provided at the bottom of the third receptacle. While the first ferrule and the second ferrule are connected, light transmitted over the optical waveguide is collected at the lens, and the collected light enters the center of the optical fiber. A related art example is disclosed in Japanese Laid-open Patent Publication No. 2013-29782.

To hold the optical waveguide inserted into the second receptacle provided to the second ferrule and whose tip is brought into contact with the second receptacle, adhesive or matching oil is used.

A bubble may be formed in the adhesive or the matching oil and stay between the bottom of the second receptacle and the tip of the optical waveguide, and may reduce the optical transmission efficiency at the optical connector.

SUMMARY

According to an aspect of an embodiment, an optical connector includes a connector body; an enclosure that is a slit-shaped hole extending from a first surface of the connector body into the connector body, and accommodates a sheet-like optical waveguide having an approximately same width as that of the hole; and a first pass-through hole that is provided near a bottom of the enclosure against which a tip of the optical waveguide enclosed in the enclosure abuts, and passes through a second surface of the connector body intersecting with the first surface, and a first side surface of the enclosure.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
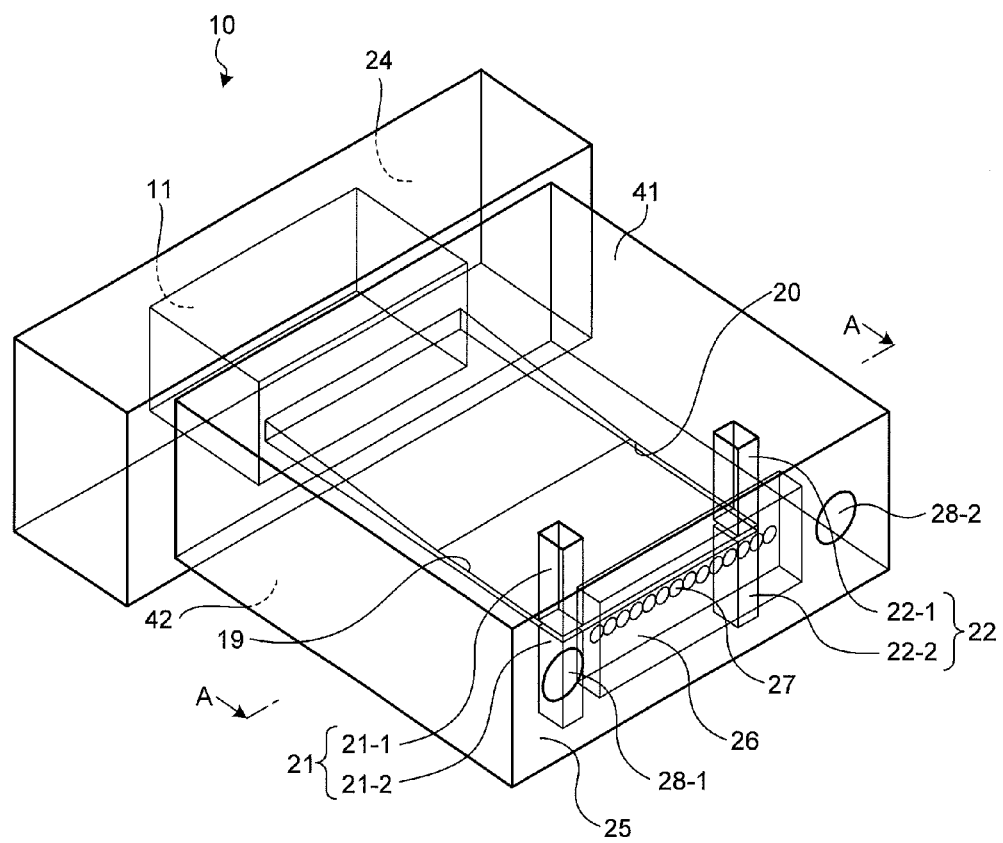
FIG. 1 is a schematic illustrating an example of a connector body in an optical connector according to one embodiment of the present invention.

Embodiments of the present invention will be explained with reference to accompanying drawings. This embodiment is not intended to limit the scope of the optical connector according to the present invention in any way. In the embodiment, elements having the same function are assigned with the same reference numerals, and a redundant explanation thereof is omitted herein.

Exemplary Structure of Optical Connector

Figure 2:
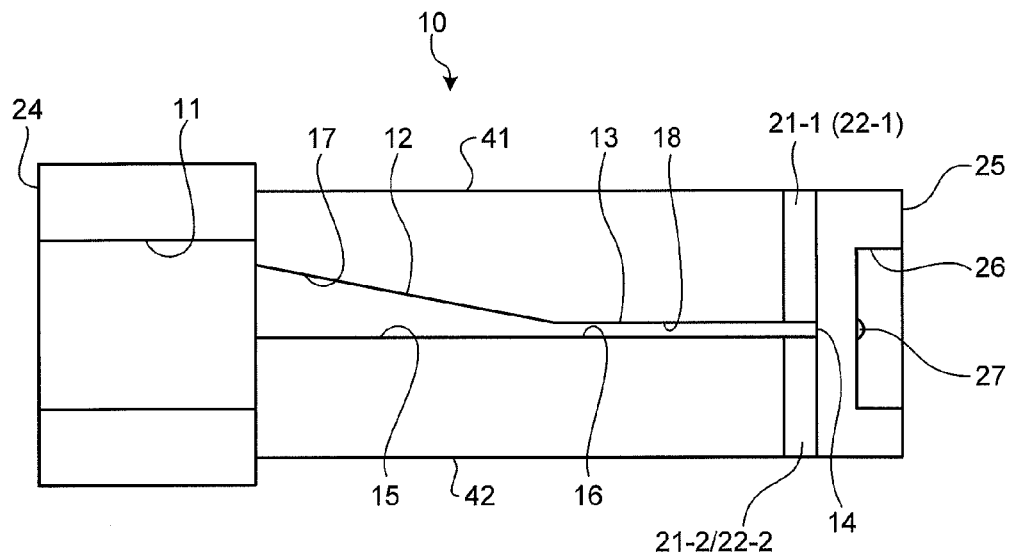
FIG. 2 is another schematic illustrating the example of the connector body in the optical connector according to the embodiment.
Figure 3:
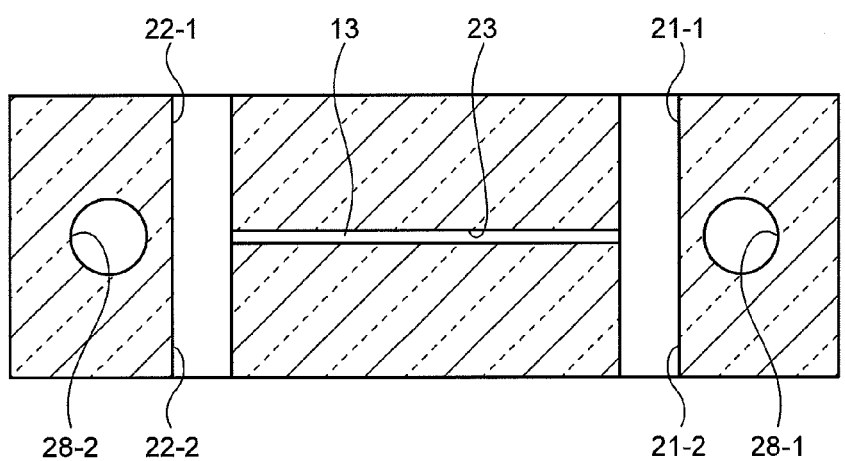
FIG. 3 is a cross-sectional view across the line A-A in FIG. 1.

FIGS. 1 and 2 are schematics illustrating an example of a connector body in an optical connector according to one embodiment of the present invention. FIG. 1 is an exemplary perspective view of the connector body. FIG. 2 is a side view in a direction of the optical transmission. FIG. 3 is a cross-sectional view across the line A-A in FIG. 1.

A connector body 10 has a boot slit 11 into which a rubber boot holding an optical waveguide 30 described later is fitted, an insertion slit 12 extending from the rubber boot slit 11, and an optical waveguide slit 13 (an enclosure for the optical waveguide 30) extending further from the insertion slit 12. In the connector body 10, the rubber boot slit 11, the insertion slit 12, and the optical waveguide slit 13 together form a continuous hole extending from the insertion surface 24 (a first surface of the connector body 10) from which the optical waveguide 30 is inserted into the connector body 10. A slit bottom 14 is formed at a position where the optical waveguide slit 13 ends. The inner circumference of the optical waveguide slit 13 has approximately the same shape as the cross section of the optical waveguide 30 described later.

A bottom surface 15 of the insertion slit 12 is a plane approximately perpendicularly intersecting with the insertion surface of the connector body 10. A top surface 17 of the insertion slit 12 forms a first angle with the bottom surface 15, and approaches the bottom surface 15 as the top surface 17 extends further into the insertion slit 12. In other words, the insertion slit 12 has a one-sided tapered structure at the first angle.

The bottom surface 16 of the optical waveguide slit 13 is a plane approximately perpendicularly intersecting with the insertion surface of the connector body 10. A top surface 18 of the optical waveguide slit 13 also is a plane approximately perpendicularly intersecting with the insertion surface of the connector body 10. In other words, the bottom surface 16 and the top surface 18 of the optical waveguide slit 13 are approximately in parallel. The bottom surface 15 of the insertion slit 12 and the bottom surface 16 of the optical waveguide slit 13 form one continuous plane. Because the insertion slit 12 has a one-sided tapered structure, as mentioned earlier, the optical waveguide 30 can be easily inserted into the optical waveguide slit 13. The insertion slit 12 may be provided with a two-sided tapered structure to allow the optical waveguide 30 to be inserted into the optical waveguide slit 13 even more easily.

Provided near the slit bottom 14 are through holes 21-1 passing through a top surface 41 of the connector body 10 intersecting with the insertion surface, and the top surface 18 of the optical waveguide slit 13. Each through hole 21-1 is provided at one end of the width direction of the optical waveguide slit 13, e.g., at the corner between a right side surface 19 and the slit bottom 14 of the optical waveguide slit 13, and extends approximately perpendicularly to the width direction of the optical waveguide slit 13.

Provided near the slit bottom 14 is another through hole 21-2 passing through a bottom surface 42 of the connector body 10 intersecting with the insertion surface, and the bottom surface 16 of the optical waveguide slit 13. Specifically, the pass-through hole 21-2 is provided at one end of the width direction of the optical waveguide slit 13, e.g., at the corner between the right side surface 19 and the slit bottom 14 of the optical waveguide slit 13, and extends approximately perpendicularly to the width direction of the optical waveguide slit 13. In other words, the pass-through hole 21-1 and the pass-through hole 21-2 form one continuous pass-through hole 21.

Provided near the slit bottom 14 is another through hole 22-1 passing through the top surface 41 of the connector body 10 and the top surface 18 of the optical waveguide slit 13. Specifically, the pass-through hole 22-1 is provided at the other end of the width direction of the optical waveguide slit 13, e.g., at the corner between a left side surface 20 and the slit bottom 14 of the optical waveguide slit 13, and extends approximately perpendicularly to the width direction of the optical waveguide slit 13. In other words, the pass-through holes 22-1 and 21-1 are positioned symmetrically with respect to the center of the optical waveguide slit 13 in the width direction, and have a symmetric structure.

Provided near the slit bottom 14 is another through hole 22-2 passing through the bottom surface 42 of the connector body 10 and the bottom surface 16 of the optical waveguide slit 13. Specifically, the pass-through hole 21-2 is provided at the other end of the width direction of the optical waveguide slit 13, e.g., at the corner between the left side surface 20 and the slit bottom 14 of the optical waveguide slit 13, and extends approximately perpendicularly to the width direction of the optical waveguide slit 13. In other words, the pass-through holes 22-2 and 21-2 are positioned symmetrically with respect to the center of the optical waveguide slit 13 in the width direction, and have a symmetric structure. The pass-through holes 22-1 and 22-2 form one continuous pass-through hole 22.

A receptacle 26 is provided on a second surface opposite to the first surface of the connector body 10, that is, on a connecting surface 25 for a facing connector body (not illustrated) that is paired with the connector body 10. On the bottom of the receptacle 26, a plurality of micro-lenses 27 are provided in a line so that the center of each of the micro-lenses 27 is aligned along a virtual reference plane.

On the connecting surface 25 of the connector body 10, a pair of receptacles 28-1 and 28-2 are provided. Protrusions are provided on the connecting surface of the facing connector body (not illustrated) paired with the connector body 10. The protrusions are inserted into the receptacles 28-1 and 28-2. While the connecting surface of the connector body 10 is kept in contact with the connecting surface of the facing connector body paired with the connector body 10, the connector body 10 is connected to the facing connector body.

Figure 4:
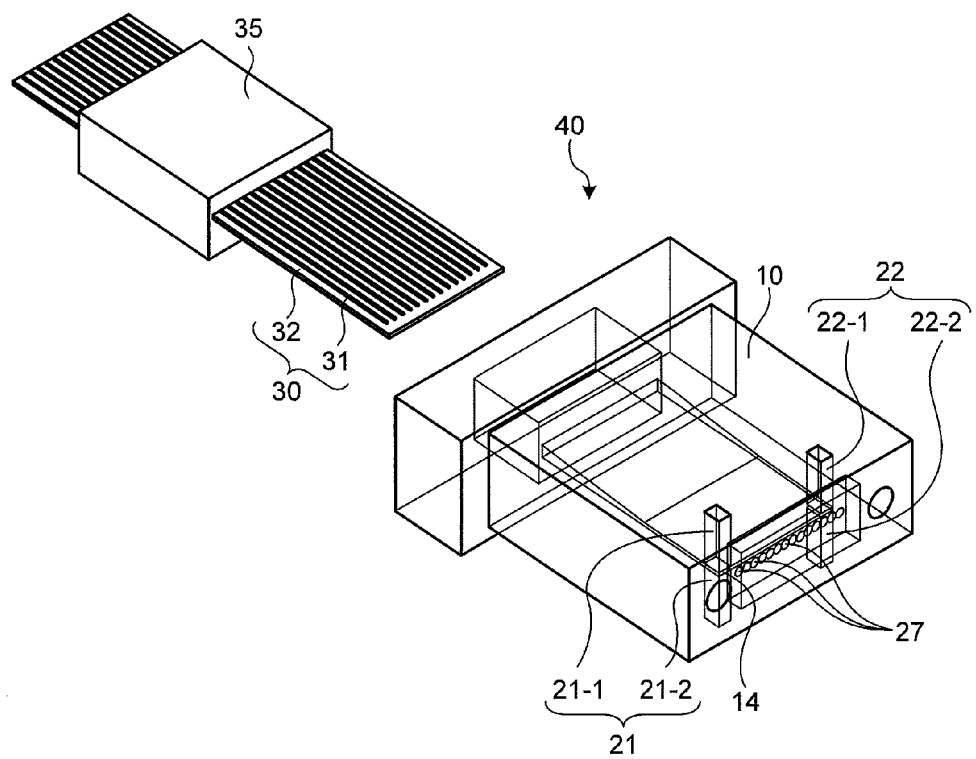
FIG. 4 is a schematic for explaining assembling of the optical connector having an optical waveguide.
Figure 5:
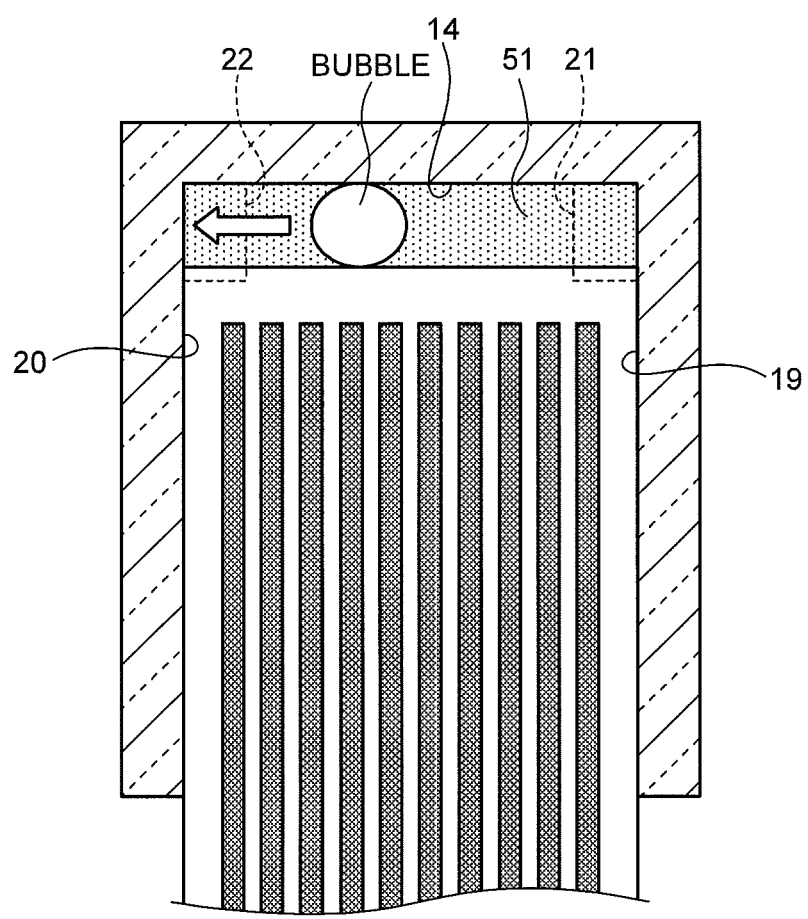
FIG. 5 is another schematic for explaining the assembling of the optical connector having an optical waveguide.

The optical waveguide 30 is inserted into the optical waveguide slit 13 inside of the connector body 10 (corresponding to an enclosure). FIGS. 4 and 5 are schematics for explaining assembling of the optical connector 40 having the optical waveguide 30.

The optical waveguide 30 includes a plurality of cores 31 and a cladding 32 that covers the outer circumference of the cores 31. Adhesive 51 (or matching oil) is applied at the tip of the optical waveguide 30, and the optical waveguide 30 is placed between a rubber boot 35. The tip of the optical waveguide 30 is then inserted into the optical waveguide slit 13. Because the cladding 32 has a smaller refractive index than the core 31, the light input to one end of the core 31 is transmitted by repeating total reflections in the core 31, and output to the other end of the core 31.

As the tip of the optical waveguide 30 is brought near the slit bottom 14, a bubble may be formed in the adhesive 51 (or matching oil) squeezed between the tip of the optical waveguide 30 and the slit bottom 14, as illustrated in FIG. 5. By pushing the optical waveguide 30 further into the connector body 10 to the point where the tip abuts against the slit bottom 14, the tip of the optical waveguide 30 pushes the bubble away into the through hole 21 or the through hole 22, so that the bubble can be released outside of the connector body 10 via the pass-through hole 21 or the pass-through hole 22. In this manner, a reduction in the optical transmission efficiency in the optical connector 40 caused by a bubble can be avoided.

Furthermore, for example, because the pass-through hole 21-1 is provided at one end of the width direction of the optical waveguide slit 13, as illustrated in FIG. 5, the opening of the pass-through hole 21-1 on the top surface 18 of the optical waveguide slit 13 matches a part of the tip of the optical waveguide 30. In other words, by providing the pass-through hole 21-1 at one end of the width direction of the optical waveguide slit 13, an area 23 of the top surface 18 of the optical waveguide slit 13 holding down the tip of the optical waveguide 30 can be increased. In this manner, the tip of the optical waveguide 30 can be prevented from curling. Therefore, a reduction in the optical transmission efficiency in the optical connector 40 can be prevented.

Exemplary Structure of Optical Module

Figure 6:
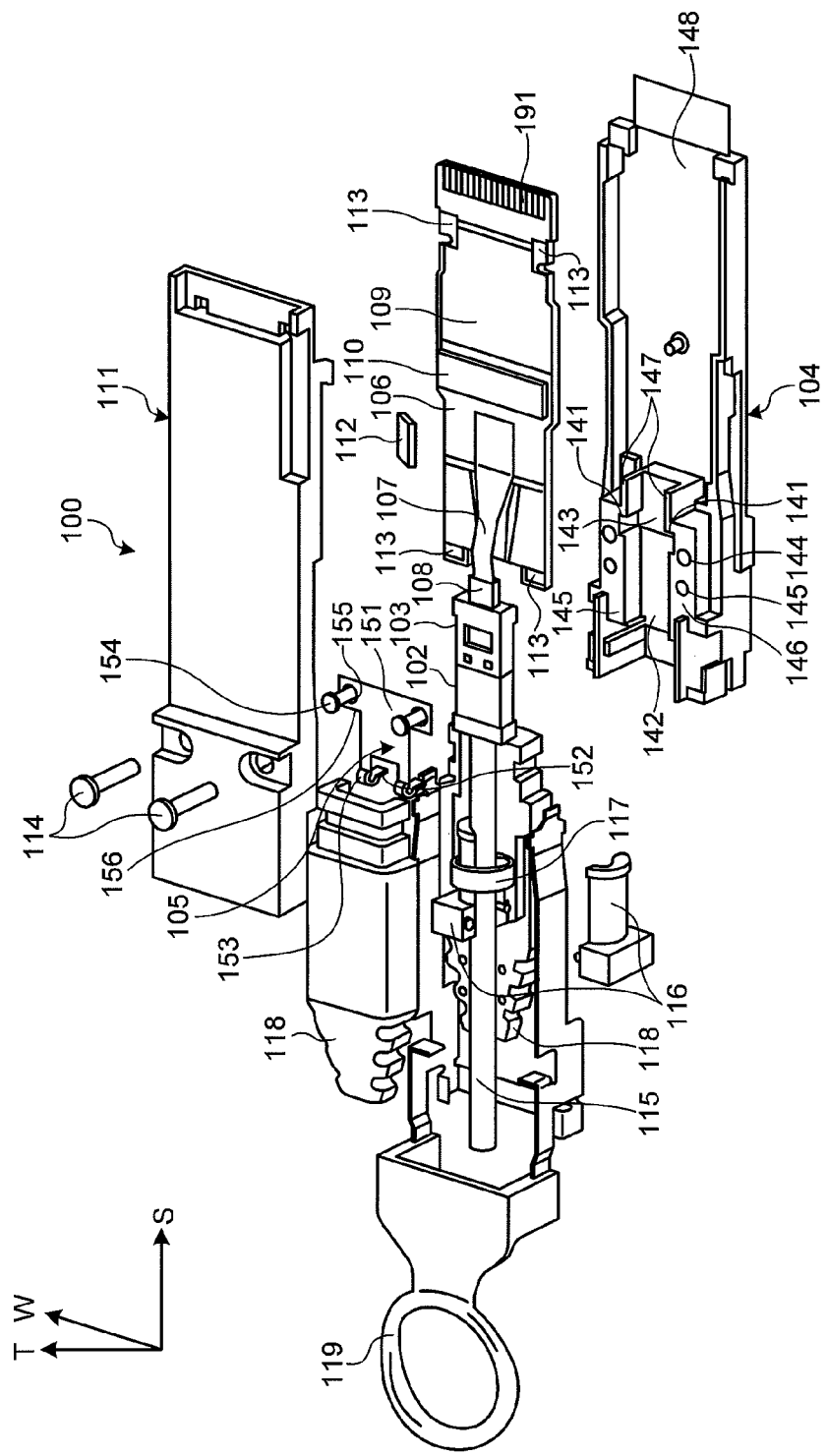
FIG. 6 is a schematic of an example of an optical module including the optical connector according to the embodiment.

An example of an optical module including the optical connector will now be explained. FIG. 6 is a schematic of an example of an optical module including the optical connector according to the embodiment.

As illustrated in FIG. 6, this optical module 100 includes a mechanically transferable (MT) ferrule 102 and a lens ferrule 103 that is aligned with the MT ferrule 102 via alignment pins. The lens ferrule 103 corresponds to the connector body 10. The optical module 100 also includes a lower cover 104 having a support 141 for supporting the lens ferrule 103 from the side of a connecting direction S, and a ferrule clip 105 fastened to the lower cover 104 to press the MT ferrule 102 against the lens ferrule 103. The support 141 is a wall facing the opposite direction of the connecting direction S.

In FIG. 6, "S" represents the direction in which the MT ferrule 102 is connected to the lens ferrule 103, "T" represents a thickness direction of the plate-like lower cover 104 of the optical module 100 in a direction from the bottom toward the opening, and "W" represents a width direction that is perpendicular to the connecting direction S and the thickness direction T. In FIG. 6, for the illustrative purpose, the arrow representing the thickness direction T is illustrated to point upwardly, and the arrow representing the width direction W is illustrated to point to the left with respect to the connecting direction S. Only the connecting direction S, and not the thickness direction T and the width direction W, has directionality.

The MT ferrule 102 has an almost cuboid shape, and has an extended portion extended in the width direction W and the thickness direction T on the side opposite to the connecting direction S. The lens ferrule 103 also has an almost cuboid shape, and has an extended portion extended in the width direction W and the thickness direction T on the side of the connecting direction S. The support 141 on the lower cover 104 supports the right end surface of the extended portion of the lens ferrule 103.

The ferrule clip 105 includes a plate-like portion 151 fastened to the lower cover 104, a pair of abutting portions 152 abutting against the left end surface of the MT ferrule 102, a pair of springs 153 connecting the abutting portions 152 to the plate-like portion 151 and giving a biasing force to the abutting portions 152 toward the MT ferrule 102. An example of the material of the ferrule clip 105 includes a flexible metal. The ferrule clip 105 also includes screws 154 to be tightened to the lower cover 104, and threaded holes 155 in which the screws 154 are passed. The plate-like portion 151 has a pair of tabs 156 correspondingly to the threaded holes 155.

The lower cover 104 has a U-shaped cutout 142 in which the MT ferrule 102 and the lens ferrule 103 are fitted and aligned. On the side nearer to the support 141 than the cutout 142, an enclosure 143 that accommodates the extended portion of the lens ferrule 103 is provided. The enclosure 143 is wider in the width direction W and deeper in the thickness direction T than the cutout 142. The lower cover 104 also has a block portion 146 having a pair of female screws 144 corresponding to screws 114 on an upper cover 111, and a pair of female screws 145 corresponding to the screws 154 on the ferrule clip 105, at positions outside of the cutout 142 in the width direction W. The female screws 144 are positioned nearer to the support 141 than the female screws 145. A pair of enclosure walls 147 that accommodates a ferrule boot 108 therebetween is provided nearer to the connecting direction S than the support 141. The ferrule boot 108 corresponds to the rubber boot 35.

The optical module 100 includes an optical waveguide 107 extending from the lens ferrule 103 toward an optical engine 106, and the ferrule boot 108 for keeping the optical waveguide 107 bent. The optical waveguide 107 corresponds to the optical waveguide 30. Because the ferrule boot 108 is positioned at a shorter distance to the optical engine 106 than the length of the optical waveguide 107, the optical waveguide 107 is kept bent.

The optical module 100 also includes a printed board 109, and an electrical connector 110 implemented at a predetermined position on the printed board 109, and the optical engine 106 is connected to the electrical connector 110 and positioned on the printed board 109. An edge connector 191 is implemented on the right edge of the printed board 109.

The optical module 100 includes the upper cover 111 for covering the opening of the lower cover 104, and a thermal conducting sheet 112 conducting the heat produced by the optical engine 106 to the upper cover 111 to release the heat.

In the printed board 109, the area from where the electrical connector 110 is implemented to where the card edge connector 191 is placed is wider than the area where the optical engine 106 is implemented in the width direction W. The printed board 109 is housed in a board enclosure 148 positioned nearer to the connecting direction S than the enclosure walls 147 of the lower cover 104.

An optical fiber 115 extends from the MT ferrule 102, on the side opposite to the connecting direction S. The optical fiber 115 is passed through a pair of sleeves 116 and a fastening ring 117, and fitted in a pair of cable boots 118. A pull-tab/latch 119 is attached to the cable boot 118.

To fill the gap formed between the printed board 109 and the upper cover 111, synthetic resin members 113 are positioned at predetermined positions of the printed board 109.

As described above, according to the embodiment, the optical connector 40 includes the optical waveguide slit 13 (corresponding to the enclosure) and the pass-through hole 21-1. The optical waveguide slit 13 is a hole extending from the insertion surface (that is the first surface) of the connector body 10 into the connector body 10. The optical waveguide slit 13 accommodates the sheet-like optical waveguide 30 whose tip abuts against the slit bottom 14. The pass-through hole 21-1 is provided near the slit bottom 14, and passes through the top surface 41 of the connector body 10 and the top surface 18 of the optical waveguide slit 13.

With this structure of the optical connector 40, a bubble in the adhesive 51 (or matching oil) used for securing the optical waveguide 30 can be released via the pass-through hole 21-1 to the outside of the connector body 10. Therefore, a reduction in the optical transmission efficiency in the optical connector 40 caused by a bubble can be avoided.

Specifically, the pass-through hole 21-1 is provided at one end of the width direction of the optical waveguide slit 13, e.g., at the corner between the right side surface 19 and the slit bottom 14 of the optical waveguide slit 13, and extends in a direction intersecting with the width direction of the optical waveguide slit 13. In this embodiment, the pass-through hole 21-1 extends approximately perpendicularly to the width direction of the optical waveguide slit 13. In other words, the opening of the pass-through hole 21-1 on the top surface 18 of the optical waveguide slit 13 faces a part of the tip of the optical waveguide 30.

With this structure of the optical connector 40, the area 23 of the top surface 18 of the optical waveguide slit 13 holding down the tip of the optical waveguide 30 can be increased. In this manner, the tip of the optical waveguide 30 can be prevented from curling. Therefore, a reduction in the optical transmission efficiency in the optical connector 40 can be prevented.

Furthermore, the optical connector 40 includes the pass-through hole 22-1 provided on the other end of the width direction of the optical waveguide slit 13. The pass-through hole 22-1 is provided at the corner between the left side surface 20 and the slit bottom 14 of the optical waveguide slit 13, for example, and extends in a direction intersecting with the width direction of the optical waveguide slit 13. In this embodiment, the pass-through hole 21-1 extends approximately perpendicularly to the width direction of the optical waveguide slit 13. In other words, the pass-through holes 22-1 and 21-1 are positioned symmetrically with respect to the center of the optical waveguide slit 13 in the width direction.

With this structure of the optical connector 40, when a bubble is formed at a position nearer to the right side surface 19 or to the left side surface 20 of the optical waveguide slit 13, the bubble can be released smoothly from the pass-through hole 21-1 or the pass-through hole 22-1.

The optical connector 40 also includes the pass-through hole 21-2 passing through the bottom surface 42 of the connector body 10 and the bottom surface 16 of the optical waveguide slit 13. The pass-through hole 21-2 is provided at one end of the width direction of the optical waveguide slit 13, e.g., at the corner between the right side surface 19 and the slit bottom 14 of the optical waveguide slit 13, for example, and extends in a direction intersecting with the width direction of the optical waveguide slit 13. In this embodiment, the pass-through hole 21-1 extends approximately perpendicularly to the width direction of the optical waveguide slit 13. In other words, the pass-through hole 21-2 is provided on the side opposite to the pass-through hole 21-1 with the optical waveguide slit 13 positioned between these pass-through holes, and the pass-through holes 21-1 and 21-2 form one continuous pass-through hole 21.

With this structure of the optical connector 40, the strength of the mold used in injection-forming the connector body 10 can be improved. To explain more, in order to form the slit-shaped optical waveguide slit 13, the mould is provided with a thin plate-like member. Because the plate-like member is thin, this member could be deformed or damaged easily. The mould also has pillar-like members to form the pass-through holes 21-1 and 21-2. Because the pass-through holes 21-1 and 21-2 form one continuous pass-through hole with the optical waveguide slit 13 positioned between these pass-through holes, as described earlier, the plate-like member on the mould is sandwiched between the pillar-like member corresponding to the pass-through holes 21-1 and another pillar-like member corresponding to the pass-through holes 21-2. Because points at which the plate-like member is supported by the mould are increased, the strength of the mould can be increased.

The optical connector 40 also includes the pass-through hole 22-2 provided on the side opposite to the pass-through hole 22-1 with the optical waveguide slit 13 positioned between these pass-through holes, and forming one continuous pass-through hole 22 with the pass-through hole 22-1.

With this structure of the optical connector 40, the strength of the mould used in injection-forming the connector body 10 can be further improved.

According to one aspect of the present invention, an optical connector capable of preventing an optical transmission efficiency reduction can be achieved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical connector comprising:
   a connector body;
   an enclosure extending from a first surface of the connector body into the connector body, and accommodating a sheet-like optical waveguide having an approximately same width as that of the enclosure; and
   a first through hole passing through the connector body from a second surface of the connector body to a first side surface of the enclosure, is provided at one end of a width direction of the enclosure, and extends in a direction intersecting with a direction where the optical waveguide is inserted into the enclosure, the second surface intersecting with the first surface, wherein
   the first through hole is provided at a tip of the enclosure and at an end of a width direction of the optical waveguide, and
   the tip of the optical waveguide abuts against the enclosure at a position other than where the first through hole is provided.

2. The optical connector according to claim 1, wherein the first through hole extends in a direction intersecting with the width direction of the enclosure.

3. The optical connector according to claim 2, further comprising a portion defining a second through hole provided at another end of the width direction of the enclosure, wherein the first through hole and the second through hole are positioned symmetrically with respect to center of the width direction of the enclosure.

4. The optical connector according to claim 1, wherein an opening of the first through hole on the first side surface of the enclosure faces a part of the tip of the optical waveguide enclosed in the enclosure.

5. The optical connector according to claim 1, wherein the first through hole passes through a second side surface of the enclosure facing the first side surface, and a third surface of the connector body on a side opposite to the second surface.

* * * * *